United States Patent
Li et al.

(10) Patent No.: US 12,404,377 B2
(45) Date of Patent: Sep. 2, 2025

(54) FIBER BUNDLING AGENT, FIBER MATERIAL, FORMING MATERIAL, AND FORMED PRODUCT

(71) Applicant: DIC Corporation, Tokyo (JP)

(72) Inventors: Fuchih Li, Osaka (JP); Kenji Nagao, Osaka (JP)

(73) Assignee: DIC Corporation, Tokyo (JP)

( * ) Notice: Subject to any disclaimer, the term of this patent is extended or adjusted under 35 U.S.C. 154(b) by 272 days.

(21) Appl. No.: 18/012,642

(22) PCT Filed: Jun. 3, 2021

(86) PCT No.: PCT/JP2021/021119
§ 371 (c)(1),
(2) Date: Dec. 22, 2022

(87) PCT Pub. No.: WO2021/261197
PCT Pub. Date: Dec. 30, 2021

(65) Prior Publication Data
US 2023/0250243 A1    Aug. 10, 2023

(30) Foreign Application Priority Data
Jun. 23, 2020  (JP) ................................ 2020-107644

(51) Int. Cl.
| | |
|---|---|
| *C08J 5/04* | (2006.01) |
| *D06M 15/27* | (2006.01) |
| *D06M 15/273* | (2006.01) |
| *D06M 15/55* | (2006.01) |
| *D06M 15/564* | (2006.01) |

(52) U.S. Cl.
CPC ............. *C08J 5/042* (2013.01); *D06M 15/27* (2013.01); *D06M 15/273* (2013.01); *D06M 15/55* (2013.01); *D06M 15/564* (2013.01); *C08J 2363/02* (2013.01)

(58) Field of Classification Search
CPC .... C08J 5/042; C08J 2363/02; C08J 2300/24; C08J 5/06; D06M 15/27; D06M 15/273; D06M 15/3562; D06M 15/55; D06M 15/564
See application file for complete search history.

(56) References Cited

U.S. PATENT DOCUMENTS

| | | |
|---|---|---|
| 11,168,187 B2 | 11/2021 | Nagao |
| 2020/0115514 A1 | 4/2020 | Nagao |

FOREIGN PATENT DOCUMENTS

| | | | |
|---|---|---|---|
| CN | 110662865 | 1/2020 | |
| EP | 3633099 A1 * | 4/2020 | ............ C03C 25/16 |
| TW | 201903245 | 1/2019 | |
| WO | 2018216457 | 11/2018 | |

OTHER PUBLICATIONS

"International Search Report (Form PCT/ISA/210) of PCT/JP2021/021119," mailed on Aug. 10, 2021, with English translation thereof, pp. 1-4.

* cited by examiner

*Primary Examiner* — Elizabeth M Imani
(74) *Attorney, Agent, or Firm* — JCIPRNET

(57) ABSTRACT

To provide a fiber bundling agent containing: a vinyl ester resin (A) having an alkoxy polyoxyalkylene structure, a urethane bond, a (meth)acryloyl group, and an epoxy group; and an aqueous medium, in which the vinyl ester resin (A) has an epoxy equivalent of 3,500 g/eq to 11,000 g/eq. Since the fiber bundling agent is excellent in bundling properties and in interfacial shear strength between fiber resins, the fiber bundling agent is suitably used for production of a fiber material capable of imparting excellent strength to a molded product.

7 Claims, No Drawings

FIBER BUNDLING AGENT, FIBER MATERIAL, FORMING MATERIAL, AND FORMED PRODUCT

CROSS-REFERENCE TO RELATED APPLICATION

This application is a 371 application of an international PCT application serial no. PCT/JP2021/021119, filed on Jun. 3, 2021, which claims the priority benefit of Japan application JP2020-107644, filed on Jun. 23, 2020. The entirety of the above-mentioned patent application is hereby incorporated by reference herein and made a part of this specification.

TECHNICAL FIELD

The present invention relates to a fiber bundling agent, a fiber material, a molding material, and a molded product.

BACKGROUND ART

Fiber reinforced plastics containing a matrix resin such as an epoxy resin or a vinyl ester resin (epoxy acrylate) and a glass fiber, a carbon fiber or the like are used for automobile members, aircraft members or other members which require high strength and excellent durability.

As the glass fiber or the carbon fiber used in the fiber reinforced plastics, a fiber material formed into a bundle of about several thousands to several tens of thousands of fibers by a fiber bundling agent is usually used from the viewpoint of imparting high strength.

As the fiber bundling agent, for example, a fiber bundling agent containing a vinyl ester resin having an alkoxy polyoxyalkylene structure and a urethane bond is known (for example, see PTL 1). However, although this fiber bundling agent has excellent bundling properties, there is a problem that interfacial shear strength between fiber resins is insufficient.

CITATION LIST

Patent Literature

PTL 1: WO2018/216457

SUMMARY OF INVENTION

Technical Problem

An object of the invention is to provide a fiber bundling agent excellent in bundling properties and interfacial shear strength between fiber resins.

Solution to Problem

As a result of studies to solve the above problems, the present inventors have found that the above problems can be solved by using a fiber bundling agent containing a vinyl ester resin having a specific structure and an aqueous medium, and have completed the invention.

That is, the invention relates to a fiber bundling agent containing: a vinyl ester resin (A) having an alkoxy polyoxyalkylene structure, a urethane bond, a (meth)acryloyl group, and an epoxy group; and an aqueous medium, in which the vinyl ester resin (A) has an epoxy equivalent of 3,500 g/eq to 11,000 g/eq.

Advantageous Effects of Invention

The fiber bundling agent according to the invention can be used for production of a fiber material capable of imparting excellent strength to a molded product, and can be suitably used as a bundling agent for a glass fiber, a carbon fiber, and the like because the fiber bundling agent is excellent in bundling properties of a fiber.

DESCRIPTION OF EMBODIMENTS

A fiber bundling agent according to the invention contains a vinyl ester resin (A) having an alkoxy polyoxyalkylene structure, a urethane bond, a (meth)acryloyl group, and an epoxy group, and an aqueous medium.

The vinyl ester resin (A) will be described. The vinyl ester resin (A) has an alkoxy polyoxyalkylene structure, and the alkoxy polyoxyalkylene structure is a structure in which one end of a polyoxyalkylene chain is blocked with an alkoxy group.

Examples of the polyoxyalkylene chain include a polyoxyethylene chain, a polyoxypropylene chain, and a polyoxybutylene chain, which are arranged in a block form or a random form.

Examples of the alkoxy group for blocking the end of the polyoxyalkylene chain include a methoxy group, an ethoxy group, a propoxy group, and a butoxy group.

The alkoxy polyoxyalkylene structure preferably has 35% by mass or more of an oxyethylene structural unit in a structure thereof in order to further improve the water dispersibility.

In addition, the alkoxy polyoxyalkylene structure preferably has a number average molecular weight of 300 to 7,000 in order to further improve the water dispersibility.

The mass proportion of the alkoxy polyoxyalkylene structure in the vinyl ester resin (A) is preferably 3% by mass to 60% by mass, and more preferably 10% by mass to 55% by mass in order to further improve the water dispersibility.

In addition, the vinyl ester resin (A) has a (meth)acryloyl group, and the (meth)acryloyl equivalent in the vinyl ester resin (A) is preferably 3,500 g/eq to 11,000 g/eq, and more preferably 5,000 g/eq to 9,000 g/eq in order to improve bundling properties and further improve interfacial shear strength.

In the invention, "(meth)acryloyl" refers to one or both of acryloyl and methacryloyl, "(meth)acrylic acid" refers to one or both of acrylic acid and methacrylic acid, "(meth) acrylate" refers to one or both of acrylate and methacrylate, and "acid (anhydride)" refers to one or both of acid and acid anhydride.

The vinyl ester resin (A) has an epoxy group, and the epoxy equivalent in the vinyl ester resin (A) is 3,500 g/eq to 11,000 g/eq, and in order to further improve the interfacial shear strength, the epoxy equivalent in the vinyl ester resin (A) is preferably 4,000 g/eq to 10,000 g/eq, and more preferably 5,000 g/eq to 9,000 g/eq.

In addition, the vinyl ester resin (A) preferably has a structure derived from a bisphenol A epoxy resin in order to obtain a molded product having improved bundling properties and higher strength.

The weight average molecular weight of the vinyl ester resin (A) is preferably 5,000 to 30,000, and more preferably 8,000 to 18,000, in order to further improve the bundling properties.

The vinyl ester resin (A) can be obtained, for example, by reacting a urethane resin (a1) having an alkoxy polyoxyalkylene structure and an epoxy group with (meth)acrylic acid and/or (meth)acrylic anhydride (a2).

The vinyl ester resin (A) can be obtained by setting an equivalent ratio (COOH/EP) of carboxy groups (COOH) derived from the (meth)acrylic acid and/or the (meth)acrylic anhydride (a2) to epoxy groups (EP) in the urethane resin (a1) to less than 1. The equivalent ratio (COOH/EP) is preferably 0.2 to 0.6, and more preferably 0.3 to 0.5, in order to more efficiently obtain a fiber bundling agent having excellent interfacial shear strength.

A reaction between the epoxy group in the urethane resin (a1) and the (meth)acrylic acid and/or the (meth)acrylic anhydride (a2) is preferably performed at 60° C. to 140° C. using an esterification catalyst. In addition, a polymerization inhibitor or the like may also be used.

The urethane resin (a1) has an epoxy group, and the epoxy equivalent in the urethane resin (a1) is preferably in the range of 250 g/eq to 2,000 g/eq in order to obtain a molded product having improved bundling properties and higher strength.

The urethane resin (a1) can be produced, for example, by reacting a compound (a1-1) having an epoxy group and a hydroxy group, a polyisocyanate (a1-2), a polyoxyalkylene monoalkyl ether (a1-3), and, if necessary, a polyol (a1-4) other than the compound (a1-1) and a chain extender (a1-5) without a solvent or in the presence of an organic solvent by a known method in the related art. Specifically, in consideration of safety, the reaction is preferably performed at a reaction temperature of 50° C. to 120° C. for 1 hour to 15 hours.

As the compound (a1-1) having an epoxy group and a hydroxy group, for example, an epoxy resin having a hydroxy group can be used.

Examples of the epoxy resin include a bisphenol A epoxy resin, a bisphenol F epoxy resin, a phenol novolac epoxy resin, an ethylphenol novolac epoxy resin, a butylphenol novolac epoxy resin, an octylphenol novolac epoxy resin, a cresol novolac epoxy resin such as an ortho-cresol novolac epoxy resin, a resorcinol novolac epoxy resin, a bisphenol A novolac epoxy resin, a bisphenol F novolac epoxy resin, a bisphenol AD novolac epoxy resin, and a bisphenol S novolac epoxy resin. A phenol novolac epoxy resin, a cresol novolac epoxy resin, or a bisphenol A epoxy resin is preferred, and a bisphenol A epoxy resin is more preferred, in order to obtain a molded product having improved bundling properties and higher strength. Note that these epoxy resins can be used alone or in combination of two or more kinds thereof.

As the compound (a1-1), a phenol novolac epoxy resin having a hydroxy group, a cresol novolac epoxy resin having a hydroxy group, or a bisphenol A epoxy resin having a hydroxy group is preferably used. Among these, a bisphenol A epoxy resin having a hydroxy group is more preferred in order to obtain a molded product having improved bundling properties and higher strength.

As the compound (a1-1), those having an epoxy equivalent of 150 g/eq to 2,000 g/eq are preferably used, those having an epoxy equivalent of 150 g/eq to 900 g/eq are more preferably used, and those having an epoxy equivalent of 150 g/eq to 500 g/eq are still more preferably used.

The hydroxy group in the compound (a1-1) is preferably in the range of 5 mol % to 150 mol %, more preferably in the range of 5 mol % to 130 mol %, and still more preferably in the range of 5 mol % to 120 mol %, with respect to a total amount of the epoxy group in the urethane resin (a1), in order to obtain a molded product having improved bundling properties and higher strength.

Examples of the polyisocyanate (a1-2) include: aromatic polyisocyanates such as 1,3- and 1,4-phenylene diisocyanate, 1-methyl-2,4-phenylene diisocyanate (2,4-TDI), 1-methyl-2,6-phenylene diisocyanate (2,6-TDI), 1-methyl-2,5-phenylene diisocyanate, 1-methyl-2,6-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate, diethylbenzene diisocyanate, diisopropylbenzene diisocyanate, 1-methyl-3,5-diethylbenzene diisocyanate, 3-methyl-1,5-diethylbenzene-2,4-diisocyanate, 1,3,5-triethylbenzene-2,4-diisocyanate, naphthalene-1,4-diisocyanate, naphthalene-1,5-diisocyanate, 1-methyl-naphthalene-1,5-diisocyanate, naphthalene-2,6-diisocyanate, naphthalene-2,7-diisocyanate, 1,1-dinaphthyl-2,2'-diisocyanate, biphenyl-2,4'-diisocyanate, biphenyl-4,4'-diisocyanate, 3,3'-dimethylbiphenyl-4,4'-diisocyanate, diphenylmethane-4,4'-diisocyanate, diphenylmethane-2,2'-diisocyanate, and diphenylmethane-2,4-diisocyanate; aliphatic polyisocyanates such as tetramethylene diisocyanate, 1,6-hexamethylene diisocyanate (HDI), dodecamethylene diisocyanate, trimethylhexamethylene diisocyanate, and lysine diisocyanate; alicyclic polyisocyanates such as 1,3-cyclopentylene diisocyanate, 1,3-cyclohexylene diisocyanate, 1,4-cyclohexylene diisocyanate, 1,3-di(isocyanatomethyl)cyclohexane, 1,4-di(isocyanatomethyl)cyclohexane, isophorone diisocyanate (IPDI), 4,4'-dicyclohexylmethane diisocyanate, 2,4'-dicyclohexylmethane diisocyanate, 2,2'-dicyclohexylmethane diisocyanate, and 3,3'-dimethyl-4,4'-dicyclohexylmethane diisocyanate; and trimers thereof. Among these, aromatic polyisocyanates are preferred in order to further improve the interfacial shear strength.

The polyoxyalkylene monoalkyl ether (a1-3) is represented by the following general formula (1).

[Chem. 1]

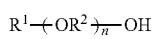

$$R^1\!-\!(OR^2)_{\overline{n}}\!-\!OH \tag{1}$$

(In the formula, $R^1$ is an alkyl group, $R^2$ is an alkylene group, and n is an integer of 1 or more.)

As the polyoxyalkylene monoalkyl ether (a1-3), those in which $R^1$ in the general formula (1) is a methyl group, an ethyl group, a propyl group, or a butyl group are preferred, and those in which $R^1$ is a methyl group are more preferred, in order to further improve the storage stability.

In addition, $R^2$ in the general formula (1) is preferably an ethylene group or a propylene group, and more preferably an ethylene group, in order to further improve the storage stability and the fiber bundling properties.

In the general formula (1), n is preferably an integer of 5 to 150, and more preferably an integer of 5 to 100, in order to further improve the storage stability, the fiber bundling properties, and the strength of the obtained molded product.

In addition, as the polyoxyalkylene monoalkyl ether (a1-3), those having a hydroxyl value in a range of 10 to 200 are preferred, and those having a hydroxyl value in a range of 15 to 200 are more preferred, in order to further improve the storage stability.

As the polyoxyalkylene monoalkyl ether (a1-3), a polyoxyethylene monoalkyl ether is more preferably used, and a polyoxyethylene monomethyl ether is particularly preferably used, in order to further improve the storage stability and the fiber bundling properties.

Examples of the polyol (a1-4) include a polyether polyol, a polycarbonate polyol, a polyester polyol, ethylene glycol, 1,2-propanediol, 1,3-butanediol, 1,4-butanediol, 3-methyl-1,5-pentanediol, 1,6-hexanediol, 1,4-cyclohexanedimethanol, neopentyl glycol, diethylene glycol, dipropylene glycol, glycerin, trimethylolpropane, an acrylic polyol obtained by introducing a hydroxy group into an acrylic copolymer, a polybutadiene polyol which is a copolymer of butadiene having a hydroxy group in a molecule, a hydrogenated polybutadiene polyol, and a partially saponified product of an ethylene-vinyl acetate copolymer.

As the polyether polyol, for example, one obtained by addition polymerization of an alkylene oxide using one or two or more compounds having two or more active hydrogen atoms as an initiator can be used.

In addition, as the polycarbonate polyol, for example, a polycarbonate polyol obtained by reacting a carbonate ester with a polyol, or a polycarbonate polyol obtained by reacting phosgene with bisphenol A or the like can be used.

In addition, as the polyester polyol, for example, a polyester polyol obtained by an esterification reaction of a low molecular weight polyol and a polycarboxylic acid, a polyester obtained by a ring-opening polymerization reaction of a cyclic ester compound such as ε-caprolactone or γ-butyrolactone, or a copolymerized polyester thereof can be used.

As the polyether polyol, the polycarbonate polyol, and the aliphatic polyester polyol, those having a number average molecular weight of 300 to 4,000 are preferably used, and those having a number average molecular weight of 500 to 2,000 are more preferably used.

As the chain extender (a1-5), a polyamine, and other compounds having an active hydrogen atom can be used, for example.

Examples of the polyamine include: diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; N-hydroxymethylaminoethylamine, N-hydroxyethylaminoethylamine, N-hydroxypropylaminopropylamine, N-ethylaminoethylamine, and N-methylaminopropylamine; diethylenetriamine, dipropylenetriamine, and triethylenetetramine; hydrazine, N,N'-dimethylhydrazine, and 1,6-hexamethylenebishydrazine; succinic acid dihydrazide, adipic acid dihydrazide, glutaric acid dihydrazide, sebacic acid dihydrazide, and isophthalic acid dihydrazide; β-semicarbazide propionic acid hydrazide, 3-semicarbazide propyl carbazate, and semicarbazide-3-semicarbazide methyl-3,5,5-trimethylcyclohexane.

Examples of other compounds having active hydrogen include: glycol compounds such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenolic compounds such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water.

The chain extender (a1-5) is used, for example, preferably in the range in which the equivalent ratio of amino groups in the polyamine to excess isocyanate groups is 1.9 or less (equivalent ratio), and more preferably in the range of 0.3 to 1.0 (equivalent ratio).

The urethanation reaction may be performed in the absence of a catalyst, but known catalysts may be used, such as tin compounds such as stannous octylate, dibutyltin dilaurate, dibutyltin dimaleate, dibutyltin diphthalate, dibutyltin dimethoxide, dibutyltin diacetylacetate, and dibutyltin diversatate, titanate compounds such as tetrabutyl titanate, tetraisopropyl titanate, and triethanolamine titanate, tertiary amine compounds, and quaternary ammonium salts.

The fiber bundling agent according to the invention contains the vinyl ester resin (A) as an essential component, and may contain an epoxy resin (B) and a vinyl ester resin (C) other than the vinyl ester resin (A).

Examples of the epoxy resin (B) include bisphenol epoxy resins such as a bisphenol A epoxy resin, a bisphenol F epoxy resin, a bisphenol fluorene epoxy resin, and a bis-cresol fluorene epoxy resin, novolac epoxy resins such as a phenol novolac epoxy resin and a cresol novolac epoxy resin, glycidyl ethers of phenols such as oxazolidone modified epoxy resin and brominated epoxy resins of these resins; glycidyl ethers of polyhydric alcohols such as dipropylene glycol diglycidyl ether, trimethylolpropane triglycidyl ether, diglycidyl ether of an alkylene oxide adduct of bisphenol A, and diglycidyl ether of hydrogenated bisphenol A; alicyclic epoxy resins such as 3,4-epoxy-6-methylcyclohexylmethyl-3,4-epoxy-6-methylcyclohexane carboxylate and 1-epoxyethyl-3,4-epoxycyclohexane, glycidyl esters such as diglycidyl phthalate, diglycidyl tetrahydrophthalate, diglycidyl-p-oxybenzoate, and glycidyl dimer acid, glycidyl amines such as tetraglycidyl diaminodiphenylmethane, tetraglycidyl-m-xylenediamine, triglycidyl-p-aminophenol, and N,N-diglycidylaniline, and heterocyclic epoxy resins such as 1,3-diglycidyl-5,5-dimethylhydantoin and triglycidyl isocyanurate. Among these, a bifunctional aromatic epoxy resin is preferred, and a bisphenol A epoxy resin and a bisphenol F epoxy resin are more preferred, in order to make the strength of a molded product, the handleability of a molding material, and the fluidity during molding of the molding material more excellent. Note that these epoxy resins can be used alone or in combination of two or more kinds thereof.

The vinyl ester resin (C) preferably has no epoxy group. Note that the vinyl ester resin (C) may be used alone or in combination of two or more kinds thereof.

As the epoxy resin as a raw material of the vinyl ester resin (C), a bifunctional aromatic epoxy resin is preferred, and a bisphenol A epoxy resin and a bisphenol F epoxy resin are more preferred, in order to make the strength of a molded product, the handleability of a molding material, and the fluidity during molding of the molding material more excellent. Note that these epoxy resins can be used alone or in combination of two or more kinds thereof.

In the invention, a vinyl ester resin is obtained by adding (meth)acrylic acid and/or (meth)acrylic anhydride to at least one epoxy group in an epoxy resin.

Examples of the aqueous medium include water, an organic solvent miscible with water, and a mixture thereof. Examples of the organic solvent miscible with water include: alcohol compounds such as methanol, ethanol, and isopropanol; ketone compounds such as acetone and methyl ethyl ketone; polyalkylene glycol compounds such as ethylene glycol, diethylene glycol, and propylene glycol; alkyl ether compounds of a polyalkylene glycol; and lactam compounds such as N-methyl-2-pyrrolidone. In the invention, water alone may be used, or a mixture of water and an organic solvent miscible with water may be used, or only an organic solvent miscible with water may be used. From the viewpoint of safety and a load on an environment, water alone or a mixture of water and an organic solvent miscible with water is preferred, and water alone is particularly preferred.

The fiber bundling agent according to the invention contains the vinyl ester resin (A) and the aqueous medium, and the vinyl ester resin (A) is preferably a water dispersion dispersed in an aqueous medium.

The fiber bundling agent according to the invention can be obtained, for example, by mixing a mixed solution of the vinyl ester resin (A) and the vinyl ester resin (C) with an emulsifier, stirring the mixture, then mixing the mixture with the aqueous medium, and performs desolvation as necessary.

Examples of the emulsifier include a polyoxyalkylene alkyl ether, a polyoxyalkylene phenyl ether, a polyoxyalkylene alkyl phenyl ether, a polyoxyalkylene benzyl phenyl ether, a polyoxyalkylene styryl phenyl ether, a polyoxyalkylene cumyl phenyl ether, a polyoxyalkylene naphthyl phenyl ether, a polyoxyalkylene fatty acid ester, a polyoxyethylene-polyoxypropylene block copolymer, and a polyethylene glycol. Among these, a polyoxyalkylene alkyl ether, a polyoxyalkylene styryl phenyl ether, and a polyoxyethylene-polyoxypropylene block copolymer are preferred, and a polyoxyalkylene alkyl ether and a polyoxyalkylene styryl phenyl ether are more preferred, in order to further improve the strength of the obtained molded product. These emulsifiers can be used alone or in combination of two or more kinds thereof.

Examples of the polyoxyalkylene alkyl ether include: polyoxyethylene alkyl ethers such as polyoxyethylene hexyl ether, polyoxyethylene octyl ether, polyoxyethylene nonyl ether, polyoxyethylene lauryl ether, polyoxyethylene stearyl ether, and polyoxyethylene eicosyl ether; and alkyl ethers of a polyoxyethylene-polyoxypropylene copolymer such as hexyl ether of a polyoxyethylene-polyoxypropylene copolymer, octyl ether of a polyoxyethylene-polyoxypropylene copolymer, nonyl ether of a polyoxyethylene-polyoxypropylene copolymer, lauryl ether of a polyoxyethylene-polyoxypropylene copolymer, stearyl ether of a polyoxyethylene-polyoxypropylene copolymer, and eicosyl ether of a polyoxyethylene-polyoxypropylene copolymer. Among these, those having 8 to 18 carbon atoms in an alkyl group, such as polyoxyethylene octyl ether, polyoxyethylene nonyl ether, polyoxyethylene lauryl ether, and polyoxyethylene stearyl ether, are particularly preferable in order to improve the emulsifiability. These polyoxyalkylene alkyl ethers may be used alone or in combination of two or more kinds thereof.

Examples of the polyoxyalkylene styryl phenyl ether include polyoxyethylene styrylphenyl ethers having 1 mole to 3 moles of styrene addition, such as polyoxyethylene monostyryl phenyl ether, polyoxyethylene distyryl phenyl ether, and polyoxyethylene tristyryl phenyl ether, and styryl phenyl ethers of a polyoxyethylene polyoxypropylene copolymer having 1 mole to 3 moles of styrene addition. Polyoxyethylene styryl phenyl ethers having 1 mole to 3 moles of styrene addition are preferred in order to improve the emulsifiability. These polyoxyalkylene styryl ethers may be used alone or in combination of two or more kinds thereof.

As the polyoxyethylene-polyoxypropylene block copolymer, those having an average molecular weight in the range of 1,000 to 30,000 are preferred, and those having an average molecular weight in the range of 5,000 to 20,000 are more preferred, in order to improve the emulsifiability. In addition, the content of polyoxyethylene is preferably in the range of 40% by mass to 90% by mass, and more preferably in the range of 50% by mass to 80% by mass.

The mass proportion of the aqueous medium in the fiber bundling agent according to the invention is preferably in the range of 10% by mass to 98% by mass, and more preferably in the range of 20% by mass to 90% by mass, in order to further improve the storage stability and the coating workability.

The mass proportion of a solid content in the fiber bundling agent according to the invention is preferably in the range of 2% by mass to 80% by mass, and more preferably in the range of 10% by mass to 70% by mass, in order to further improve the storage stability and the coating workability.

In addition, the fiber bundling agent according to the invention can be used, as required, in combination with additives such as a silane coupling agent, a curing catalyst, a lubricant, a filler, a thixotropy imparting agent, a tackifier, a wax, a heat stabilizer, a light-resistant stabilizer, a fluorescent brightening agent, and a foaming agent, a pH adjuster, a leveling agent, an antigelling agent, a dispersion stabilizer, an antioxidant, a radical scavenger, a heat resistance imparting agent, an inorganic filler, an organic filler, a plasticizer, a reinforcing agent, a catalyst, an antibacterial agent, an antifungal agent, an antirust agent, a thermoplastic resin, a thermosetting resin, a pigment, a dye, a conductivity imparting agent, an antistatic agent, a moisture permeability improver, a water repellent agent, an oil repellent agent, a hollow foam, a crystalline water-containing compound, a flame retardant, a water absorbent, a moisture absorbent, a deodorant, a foam stabilizer, a defoaming agent, a preservative, an alga-proofing agent, a pigment dispersant, an antiblocking agent, and a hydrolysis inhibitor.

In particular, when the fiber bundling agent according to the invention is used as a bundling agent for a glass fiber, it is preferable to use a silane coupling agent in combination in order to further improve the adhesion strength of the bundling agent to the glass fiber.

Examples of the silane coupling agent include γ-(2-aminoethyl)aminopropyltrimethoxysilane, γ-(2-hydroxylethyl)aminopropyltrimethoxysilane, γ-(2-aminoethyl)aminopropyltriethoxysilane, γ-(2-hydroxylethyl)aminopropyltriethoxysilane, γ-(2-aminoethyl)aminopropylmethyldimethoxysilane, aminopropylmethyldimethoxysilane, γ-(2-aminoethyl)aminopropylmethyldiethoxysilane, γ-(2-hydroxylethyl)aminopropylmethyldimethoxysilane, γ-(2-hydroxylethyl)aminopropylmethyldiethoxysilane or γ-(N,N-di-2-hydroxylethyl)aminopropyltriethoxysilane, γ-aminopropyltrimethoxysilane, γ-aminopropyltriethoxysilane, γ-aminopropylmethyldimethoxysilane, γ-aminopropylmethyldiethoxysilane or γ-(N-phenyl)aminopropyltrimethoxysilane, γ-mercaptopropyltrimethoxysilane, and γ-mercaptophenyltrimethoxysilane.

The silane coupling agent is preferably used in the range of 1 part by mass to 30 parts by mass with respect to 100 parts by mass in total of resin components in the fiber bundling agent.

In addition, the fiber bundling agent according to the invention may be used in combination with, for example, vinyl acetate-based, ethylene vinyl acetate-based, acrylic, epoxy-based, urethane-based, polyester-based, or polyamide-based emulsions, styrene-butadiene-based, acrylonitrile-butadiene-based, or acrylic-butadiene-based latexes, and further, water-soluble resins such as poval or cellulose.

The fiber bundling agent according to the invention can be used for bundling or a surface treatment of a plurality of fibers, for example, for the purpose of preventing thread breakage or fluffing of glass fibers or carbon fibers.

Examples of a fiber material which can be treated using the fiber bundling agent according to the invention include glass fibers or carbon fibers, silicon carbide fibers, pulp, hemp, cotton, nylon, polyester, acrylic, polyurethane, polyimide, or polyamide fibers made of aramids such as Kevlar and Nomex. Among these, glass fibers and carbon fibers are preferably used because the glass fibers and the carbon fibers have high strength.

As the glass fiber which can be treated using the fiber bundling agent, for example, those obtained from a raw material such as an alkali containing glass, a low alkali glass, or a non-alkali glass can be used, and in particular, it is preferable to use a non-alkali glass (E glass) which has stable mechanical properties with little deterioration over time.

In addition, as the carbon fiber which can be treated using the fiber bundling agent, a polyacrylonitrile-based carbon fiber, a pitch-based carbon fiber, or the like can be generally used. Among these, as the carbon fiber, it is preferable to use a polyacrylonitrile-based carbon fiber from the viewpoint of imparting excellent strength.

In addition, as the carbon fiber, those having a single yarn diameter of 0.5 μm to 20 μm are preferably used, and those having a single yarn diameter of 2 μm to 15 μm are more preferably used, from the viewpoint of imparting more excellent strength and the like.

As the carbon fiber, for example, a twisted yarn, a spun yarn, a spinning processed carbon fiber, or a nonwoven carbon fiber can be used. In addition, as the carbon fiber, filaments, yarns, rovings, strands, chopped strands, felts, needle punched carbon fibers, cloths, roving cloths, and milled fibers can be used.

Examples of a method of bundling glass fibers or carbon fibers using the fiber bundling agent according to the invention and forming a film on a surface of a glass fiber bundle or a carbon fiber bundle include a method of uniformly applying the fiber bundling agent to the fiber surface by other known methods such as a kiss coater method, a roller method, a dipping method, a spraying method, and brushing. When the fiber bundling agent contains an aqueous medium or an organic solvent as a solvent, the fiber bundling agent is preferably heated and dried using a heating roller, hot air, a heating plate, or the like after the application.

The amount of adhesion of the film formed on the fiber surface is preferably 0.1% by mass to 5% by mass, and more preferably 0.3% by mass to 1.5% by mass, with respect to the total mass of the bundled and surface-treated fiber bundle.

The fiber material according to the invention obtained by the method described above and bundled and surface-treated can be used in combination with a matrix resin or the like to be described later, as a molding material for producing a molded product having high strength.

When the fiber material according to the invention is used in combination with a matrix resin to form a molded product or the like, adhesion at an interface between the fiber and the matrix resin can be remarkably improved, and thus the strength of the molded product can be improved.

As the matrix resin used in the molding material according to the invention, for example, a thermosetting resin or a thermoplastic resin can be used. As the thermosetting resin, a phenol resin, a polyimide resin, a bismaleimide resin, an unsaturated polyester resin, an epoxy resin, a vinyl ester resin, a vinyl urethane resin and the like can be used. Examples of the thermoplastic resin include saturated polyester resins such as polyethylene terephthalate and polybutylene terephthalate, polyamide resins such as polypropylene, polystyrene, polycarbonate, polyphenylene sulfide, polyphenylene oxide, 6-nylon, and 6,6-nylon, acrylonitrile-styrene copolymers, acrylonitrile-butadiene-styrene copolymers, polyacetal, polyetherimide, and polyether ether ketone.

The matrix resin is preferably a thermosetting resin, and more preferably a vinyl ester resin or an unsaturated polyester resin in order to obtain a molded product having higher strength.

The molding material according to the invention contains the fiber material, the matrix resin, and, if necessary, a polymerizable monomer or the like, and for example, a molded product having higher strength can be obtained by various molding methods such as a hand lay-up method, a spray up method, an FRP lining method, a resin transfer molding method (RTM method), a resin injection method (RI method), a vacuum assist resin transfer molding method (VARTM method), an infusion molding method, a press molding method, an autoclave molding method, a filament winding method, and a drawing molding method. For example, a prepreg or a sheet molding compound (SMC) can be used for molding.

The prepreg can be produced, for example, by applying the matrix resin onto a release paper, placing a surface-treated fiber material on the applied surface, and pressing and impregnating the fiber material with a roller or the like as necessary.

When the prepreg is produced, it is preferable to use, as the matrix resin, a bisphenol A epoxy resin, a glycidyl amine epoxy resin such as tetraglycidylaminodiphenylmethane, an epoxy resin such as a novolac epoxy resin, or a vinyl ester resin, for example.

In addition, the sheet molding compound can be produced, for example, by sufficiently impregnating the surface-treated fiber material with a mixture of the matrix resin and a polymerizable unsaturated monomer such as styrene, and processing the fiber material into a sheet shape. When the sheet molding compound is produced, it is preferable to use an unsaturated polyester resin, a vinyl ester resin, or the like as the matrix resin.

Curing of the molding material proceeds, for example, by radical polymerization under a pressure or an atmospheric pressure by heating or light irradiation. In such a case, a combination of a known thermosetting agent, a known photo-curing agent, or the like can be used.

In addition, examples of the molding material include a material obtained by, for example, kneading the thermoplastic resin and the surface-treated fiber material under heating. Such a molding material can be used for secondary processing by an injection molding method, for example.

In addition, the prepreg made of the thermoplastic resin can be produced, for example, by placing a surface-treated fiber material in a sheet shape and impregnating the fiber material with a molten thermoplastic resin.

The prepreg made of the thermoplastic resin can be used for secondary processing, for example, by stacking one or more sheets and then heating and molding the sheets under a pressure or an atmospheric pressure.

A molded product obtained by using the molding material has high strength, and thus can be used for, for example, automobile members, aircraft members, wind turbine members, and industrial members.

EXAMPLES

Hereinafter, the invention will be described in more detail with reference to Examples. The epoxy equivalent was measured based on JIS K7236:2001, the acid value was measured based on JIS K0070:1992, and the average molecular weight of a resin was measured under the following GPC measurement conditions.

[GPC Measurement Conditions]
   Measurement device: High-speed GPC device ("HLC-8220GPC" manufactured by Tosoh Corporation)
   Column: The following columns manufactured by Tosoh Corporation were coupled in series and used.
   "TSKgel G5000" (7.8 mm I.D.×30 cm)×1
   "TSKgel G4000" (7.8 mm I.D.×30 cm)×1
   "TSKgel G3000" (7.8 mm I.D.×30 cm)×1
   "TSKgel G2000" (7.8 mm I.D.×30 cm)×1
   Detector: RI (differential refractometer)
   Column temperature: 40° C.
   Eluent: Tetrahydrofuran (THF)
   Flow rate: 1.0 mL/min
   Injection amount: 100 μL (tetrahydrofuran solution having a sample concentration of 4 mg/mL)
   Standard sample: A calibration curve was prepared using the following monodisperse polystyrene.
(Monodisperse Polystyrene)
   "TSKgel standard polystyrene A-500" manufactured by Tosoh Corporation
   "TSKgel standard polystyrene A-1000" manufactured by Tosoh Corporation
   "TSKgel standard polystyrene A-2500" manufactured by Tosoh Corporation
   "TSKgel standard polystyrene A-5000" manufactured by Tosoh Corporation
   "TSKgel standard polystyrene F-1" manufactured by Tosoh Corporation
   "TSKgel standard polystyrene F-2" manufactured by Tosoh Corporation
   "TSKgel standard polystyrene F-4" manufactured by Tosoh Corporation
   "TSKgel standard polystyrene F-10" manufactured by Tosoh Corporation
   "TSKgel standard polystyrene F-20" manufactured by Tosoh Corporation
   "TSKgel standard polystyrene F-40" manufactured by Tosoh Corporation
   "TSKgel standard polystyrene F-80" manufactured by Tosoh Corporation
   "TSKgel standard polystyrene F-128" manufactured by Tosoh Corporation
   "TSKgel standard polystyrene F-288" manufactured by Tosoh Corporation
   "TSKgel standard polystyrene F-550" manufactured by Tosoh Corporation Synthesis Example 1: Production of Water Dispersion of Vinyl Ester Resin (C-1)

To a 4-neck flask equipped with a thermometer, a stirring device, a reflux cooling tube, and a dropping device, 124 parts by mass of a polyoxyethylene monoethyl ether ("UNIOX M-550" manufactured by NOF Corporation, hydroxyl value: 100), 99 parts by mass of a bisphenol A epoxy resin ("EPICLON 1050" manufactured by DIC Corporation, epoxy equivalent: 477 g/eq), and 65 parts by mass of methyl ethyl ketone were added and the mixture was sufficiently stirred and dissolved at 40° C. Next, 38 parts by mass of tolylene diisocyanate was added at 40° C., the mixture was reacted at 60° C. to 65° C. for 6 hours, and the disappearance of a characteristic peak of NCO at 2,260 cm$^{-1}$ was found by an infrared absorption spectrum.

Thereafter, the mixture was cooled to 40° C., 15 parts by mass of acrylic acid, 1 part by mass of t-butylhydroquinone, and 3 parts by mass of 2-methylimidazole were charged, and the mixture was heated up to 75° C. to 80° C. under a gas flow in which nitrogen and air were mixed on a one-to-one basis. Further, when the reaction was performed at 75° C. to 80° C. for hours, the acid value was 1 mgKOH/g or less, and thus the reaction was completed. Note that a vinyl ester resin (C-1) had a weight average molecular weight of 13,000 and did not have an epoxy group.

Next, the mixture was cooled to 40° C., 27 parts by mass of polyoxyethylene distyrenated phenyl ether ("EMULGEN A-500" manufactured by Kao Corporation) was added, and the mixture was sufficiently stirred. Next, 850 parts by mass of ion exchanged water was added dropwise over 30 minutes, and the mixture was further stirred and mixed for 15 minutes. This water dispersion was concentrated by distillation under s reduced pressure to obtain a water dispersion of the vinyl ester resin (C-1) having a non-volatile content of 30% by mass.

Example 1: Production and Evaluation of Fiber Bundling Agent (1)

To a 4-neck flask equipped with a thermometer, a stirring device, a reflux cooling tube, and a dropping device, 124 parts by mass of a polyoxyethylene monoethyl ether ("UNIOX M-550" manufactured by NOF Corporation, hydroxyl value: 100), 99 parts by mass of a bisphenol A epoxy resin ("EPICLON 1050" manufactured by DIC Corporation, epoxy equivalent: 477 g/eq), and 65 parts by mass of methyl ethyl ketone were added and the mixture was sufficiently stirred and dissolved at 40° C. Next, 38 parts by mass of tolylene diisocyanate was added at 40° C., the mixture was reacted at 60° C. to 65° C. for 6 hours, and the disappearance of a characteristic peak of NCO at 2,260 cm$^{-1}$ was found by an infrared absorption spectrum.

Thereafter, the mixture was cooled to 40° C., 7.5 parts by mass of acrylic acid, 1 part by mass of t-butylhydroquinone, and 3 parts by mass of 2-methylimidazole were charged, and the mixture was heated up to 75° C. to 80° C. under a gas flow in which nitrogen and air were mixed on a one-to-one basis. Further, when the reaction was performed at 75° C. to 80° C. for hours, the acid value was 0 mgKOH/g, and thus the reaction was completed, and a solution of a vinyl ester resin (A-1) was obtained. Note that the vinyl ester resin (A-1) had a weight average molecular weight of 14,000 and had an epoxy equivalent of 7,000 g/eq.

Note that the vinyl ester resin (A-1) had a weight average molecular weight of 14,000 and had an epoxy equivalent of 7,000 g/eq.

Next, the mixture was cooled to 40° C., 27 parts by mass of polyoxyethylene distyrenated phenyl ether ("EMULGEN A-500" manufactured by Kao Corporation) was added, and the mixture was sufficiently stirred. Next, 850 parts by mass of ion exchanged water was added dropwise over 30 minutes, and the mixture was further stirred and mixed for 15 minutes. This water dispersion was concentrated by distillation under a reduced pressure to obtain a fiber bundling agent (1) as a water dispersion of the vinyl ester resin (A-1) having a non-volatile content of 30% by mass.

[Preparation of Carbon Fiber Bundle]

Non-sized yarns of polyacrylonitrile-based carbon fibers (single yarn diameter: 7 μm, strand strength: 4,400 MPa, elastic modulus: 235 GPa, 6000 yarns) were bundled, impregnated with the fiber bundling agent (1) diluted with ion exchanged water to have a non-volatile content of 5% by mass by a dipping method, and squeezed with a roller to adjust the amount of adhesion of effective components to 1% by mass, and then subjected to a heat treatment at 150° C.

for 30 minutes, thereby obtaining a carbon fiber bundle (1) subjected to a surface treatment by using the fiber bundling agent (1).

[Evaluation of Fiber Bundling Properties]

Using a TM-type abrasion tester TM-200 (manufactured by Daiei Kagaku Seiki Mfg. Co., Ltd.), the carbon fiber bundle (1) was rubbed 1,000 times (reciprocating motion speed: 300 times/min) with a tension of 50 g via three mirror-surface chrome-plated stainless steel needles arranged in a zigzag manner, and a fluffing state of the carbon fiber bundle (1) was visually determined based on the following criteria.

B: As in the case before rubbing, no fluffing was observed.
D: Fluffing was observed.

[Preparation of Monocarbon Fiber]

Non-sized yarns of polyacrylonitrile-based carbon fibers (single yarn diameter: 7 μm, strand strength: 4,400 MPa, elastic modulus: 235 GPa, 6000 yarns) were impregnated with the fiber bundling agent (1) diluted with ion exchanged water to have a non-volatile content of 5% by mass by a dipping method, and squeezed with a roller to adjust the amount of adhesion of effective components to 1% by mass, and then a monocarbon fiber was taken out.

[Preparation of Matrix Resin]

To 100 parts by mass of a vinyl ester resin solution ("EXDHOMA 9102-01NP" manufactured by DIC Corporation), 0.5 part by mass of 6% by mass cobalt naphthenate and 1.0 part by mass of methyl ethyl ketone peroxide ("PERMEK N" manufactured by NOF Corporation) were added to obtain a matrix resin.

[Evaluation of Interfacial Shear Strength]

The interfacial shear strength between fiber resins was evaluated by a microdroplet method using a composite material interfacial property evaluation device ("HM410" manufactured by Toei Sangyo Co.).

A matrix resin was attached to the obtained monocarbon fiber to prepare a microdroplet, and the microdroplet was cured at 25° C. for 12 hours and then further cured at 60° C. for 3 hours to obtain a measurement sample. A maximum pull-out load F (mN) at the time of pulling out a resin from the sample fiber was measured, and interfacial shear strength τ (MPa) was calculated according to the following equation.

$$\tau = F/\pi dL$$

(τ: interfacial shear strength (MPa), F: maximum pull-out load (mN), d: fiber diameter (μm), L: microdroplet axial length (μm))

A: The interfacial shear strength is 30 MPa or more
B: The interfacial shear strength is 20 MPa or more and less than 30 MPa
D: The interfacial shear strength is less than 20 MPa Example 2: Production and Evaluation of Fiber Bundling Agent (2)

To a 4-neck flask equipped with a thermometer, a stirring device, a reflux cooling tube, and a dropping device, 124 parts by mass of a polyoxyethylene monoethyl ether ("UNIOX M-550" manufactured by NOF Corporation, hydroxyl value: 100), 99 parts by mass of a bisphenol A epoxy resin ("EPICLON 1050" manufactured by DIC Corporation, epoxy equivalent: 477 g/eq), and 65 parts by mass of methyl ethyl ketone were added and the mixture was sufficiently stirred and dissolved at 40° C. Next, 38 parts by mass of trimethylhexamethylene diisocyanate was added at 40° C., the mixture was reacted at 60° C. to 65° C. for 6 hours, and the disappearance of a characteristic peak of NCO at 2,260 cm-1 was found by an infrared absorption spectrum.

Thereafter, the mixture was cooled to 40° C., 7.5 parts by mass of acrylic acid, 1 part by mass of t-butylhydroquinone, and 3 parts by mass of 2-methylimidazole were charged, and the mixture was heated up to 75° C. to 80° C. under a gas flow in which nitrogen and air were mixed on a one-to-one basis. Further, when the reaction was performed at 75° C. to 80° C. for hours, the acid value was 0 (mgKOH/g), and thus the reaction was completed, and a vinyl ester resin (A-2) was obtained. Note that the vinyl ester resin (A-2) had a weight average molecular weight of 13,500 and had an epoxy equivalent of 7,300 g/eq.

Next, the mixture was cooled to 40° C., 27 parts by mass of polyoxyethylene distyrenated phenyl ether ("EMULGEN A-500" manufactured by Kao Corporation) was added, and the mixture was sufficiently stirred. Next, 850 parts by mass of ion exchanged water was added dropwise over 30 minutes, and the mixture was further stirred and mixed for 15 minutes. This water dispersion was concentrated by distillation under a reduced pressure to obtain a fiber bundling agent (2) as a water dispersion of the vinyl ester resin (A-2) having a non-volatile content of 30% by mass.

Various evaluations were performed in a similar manner as in Example 1 except that the fiber bundling agent (1) used in Example 1 was changed to the fiber bundling agent (2).

Example 3: Production and Evaluation of Fiber Bundling Agent (3)

After obtaining a solution of the vinyl ester resin (A-1) in a similar manner as in Example 1, the solution was cooled to 40° C., and 465 parts by mass of a water dispersion of an epoxy resin (B-1) ("HYDRAN N-320M" manufactured by DIC Corporation) and 27 parts by mass of polyoxyethylene distyrenated phenyl ether ("EMULGEN A-500" manufactured by Kao Corporation) were added, followed by sufficient stirring. Next, 1,000 parts by mass of ion exchanged water was added dropwise over 30 minutes, and the mixture was further stirred and mixed for 15 minutes. This water dispersion was concentrated by distillation under a reduced pressure to obtain a fiber bundling agent (3) as a water dispersion of the vinyl ester resin (A-1) having a non-volatile content of 30% by mass and the epoxy resin (B-1). Vinyl ester resin (A-1)/epoxy resin (B-1)=25/75 (mass ratio).

Various evaluations were performed in a similar manner as in Example 1 except that the fiber bundling agent (1) used in Example 1 was changed to the fiber bundling agent (3).

Example 4: Production and Evaluation of Fiber Bundling Agent (4)

After obtaining a solution of the vinyl ester resin (A-1) in a similar manner as in Example 1, the solution was cooled to 40° C., and 465 parts by mass of the water dispersion of the vinyl ester resin (C-1) obtained in Synthesis Example 1 and 27 parts by mass of polyoxyethylene distyrenated phenyl ether ("EMULGEN A-500" manufactured by Kao Corporation) were added, followed by sufficient stirring. Next, 1000 parts by mass of ion exchanged water was added dropwise over 30 minutes, and the mixture was further stirred and mixed for 15 minutes. This water dispersion was concentrated by distillation under a reduced pressure to obtain a fiber bundling agent (4) as a water dispersion of the vinyl ester resin (A-1) of the vinyl ester resin (a1-1) having a non-volatile content of 30% by mass and the vinyl ester resin (C-1). Vinyl ester resin (A-1)/vinyl ester resin (C-1)=25/75 (mass ratio).

Various evaluations were performed in a similar manner as in Example 1 except that the fiber bundling agent (1) used in Example 1 was changed to the fiber bundling agent (4).

Comparative Example 1: Evaluation of Fiber Bundling Agent (R1)

The water dispersion of the vinyl ester resin (C-1) obtained in Synthesis Example 1 was used as a fiber bundling agent (R1).

Various evaluations were performed in a similar manner as in Example 1 except that the fiber bundling agent (1) used in Example 1 was changed to the fiber bundling agent (R1).

Evaluation results of Examples 1 to 4 and Comparative Example 1 are shown in Table 1.

TABLE 1

| Table 1 | | Example 1 | Example 2 | Example 3 | Example 4 | Comparative Example 1 |
|---|---|---|---|---|---|---|
| Fiber bundling agent | | (1) | (2) | (3) | (4) | (R1) |
| Resin composition (part by mass) | Vinyl ester resin (A-1) | 100 | | 25 | 25 | |
| | Vinyl ester resin (A-2) | | 100 | | | |
| | Epoxy resin (B-1) | | | 75 | | |
| | Vinyl ester resin (C-1) | | | | 75 | 100 |
| Evaluation | Fiber bundling property | B | B | B | B | B |
| | Interfacial shear strength (MPa) | A 35.6 | B 25.3 | A 30.8 | A 33.2 | D 22.7 |

It was found that the fiber bundling agents in Examples 1 to 4, which were the fiber bundling agent according to the invention, were excellent in fiber bundling properties and interfacial shear strength.

On the other hand, Comparative Example 1 was an example in which a vinyl ester resin having no epoxy group was used instead of the vinyl ester resin (A), which is an essential component in the invention, and it was found that the interfacial shear strength was insufficient.

The invention claimed is:

1. A fiber bundling agent comprising:
   a vinyl ester resin (A) having an alkoxy polyoxyalkylene structure, a urethane bond, a (meth)acryloyl group, and an epoxy group; and
   an aqueous medium, wherein
   the vinyl ester resin (A) has an epoxy equivalent of 3,500 g/eq to 11,000 g/eq.

2. The fiber bundling agent according to claim 1, wherein the vinyl ester resin (A) has a structure derived from a bisphenol A epoxy resin.

3. The fiber bundling agent according to claim 1, further comprising:
   an epoxy resin (B).

4. The fiber bundling agent according to claim 1, further comprising:
   a vinyl ester resin (C) other than the vinyl ester resin (A).

5. A fiber material comprising:
   the fiber bundling agent according to claim 1.

6. A molding material comprising:
   the fiber material according to claim 5; and;
   a thermosetting resin.

7. A molded product, which is a cured product of the molding material according to claim 6.

* * * * *